United States Patent [19]

Trent et al.

[11] Patent Number: 4,542,734
[45] Date of Patent: Sep. 24, 1985

[54] HIGH EFFICIENCY FURNACE WITH SECONDARY HEAT EXCHANGER

[75] Inventors: Bryan O. Trent, Smyrna; Ronald S. Tomlinson, Nashville, both of Tenn.

[73] Assignee: Heil-Quaker Corporation, Lewisburg, Tenn.

[21] Appl. No.: 529,471

[22] Filed: Sep. 6, 1983

[51] Int. Cl.³ .............................................. F24H 3/02
[52] U.S. Cl. ............................ 126/110 R; 126/116 R; 110/216
[58] Field of Search ............... 126/116 R, 110 R, 108; 110/203, 216, 286; 55/9, 11, 27, 80, 257 AE, 280

[56] References Cited

U.S. PATENT DOCUMENTS

| | | | |
|---|---|---|---|
| 2,237,054 | 4/1941 | Jensen | 126/101 |
| 3,944,136 | 3/1976 | Huie | 126/116 R X |
| 4,164,210 | 8/1979 | Hollowell | 126/110 R |
| 4,261,326 | 4/1981 | Ihlenfield | 126/110 R |
| 4,275,705 | 6/1981 | Schaus et al. | 126/110 R |
| 4,289,730 | 9/1981 | Tomlinson | 422/178 |
| 4,309,947 | 1/1982 | Ketterer | 110/216 X |
| 4,318,392 | 3/1982 | Schreiber et al. | 126/110 R |

Primary Examiner—Larry Jones
Attorney, Agent, or Firm—Wood, Dalton, Phillips, Mason & Rowe

[57] ABSTRACT

A domestic forced-air furnace provided with a condensate collector downstream of air moving structure for flowing the products of combustion through the furnace. The furnace includes a secondary heat exchanger. Condensate produced therein is transferred therefrom through the air moving structure to the condensate separator. The secondary heat exchanger and air moving structure are inclined slightly to the horizontal so as to cause continuous flow of condensate therethrough not only during operation of the furnace but also subsequent thereto to assure removal of condensate from the furnace components and thereby avoid corrosive damage thereto from the condensate. The secondary heat exchanger provides the primary pressure drop in the combustion product flow path, permitting control of the furnace capacity by simple modification thereof without the need for changing other components, such as the air moving structure.

17 Claims, 6 Drawing Figures

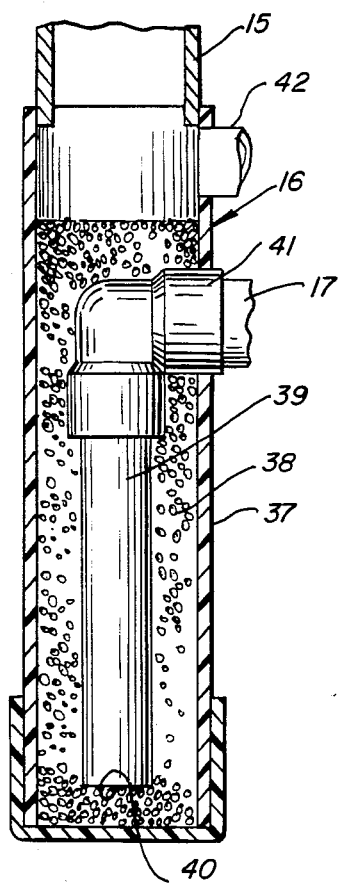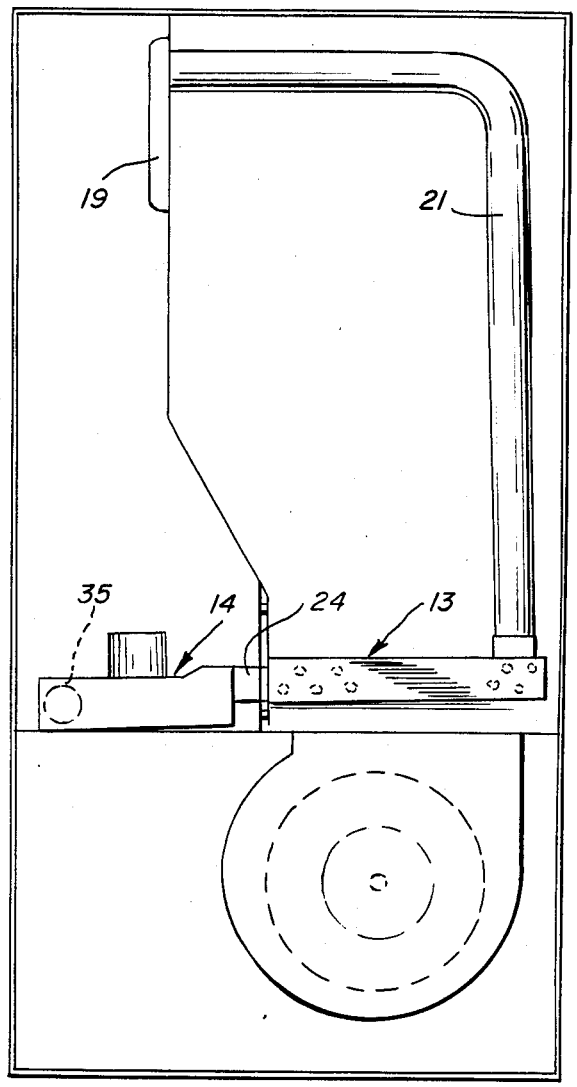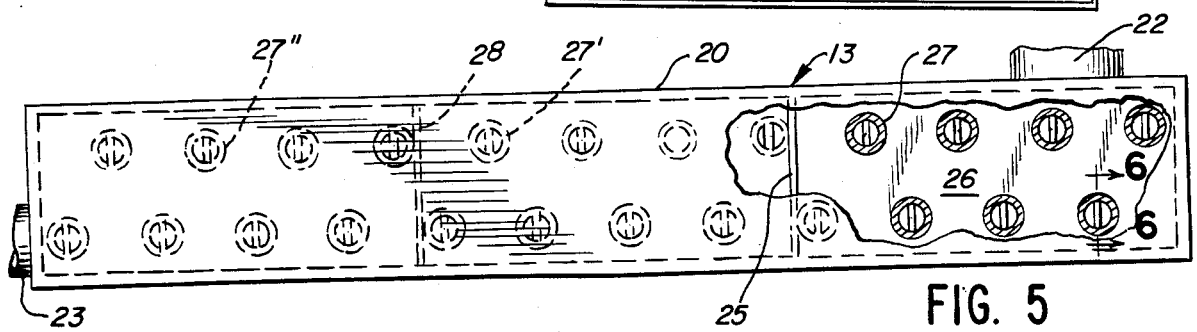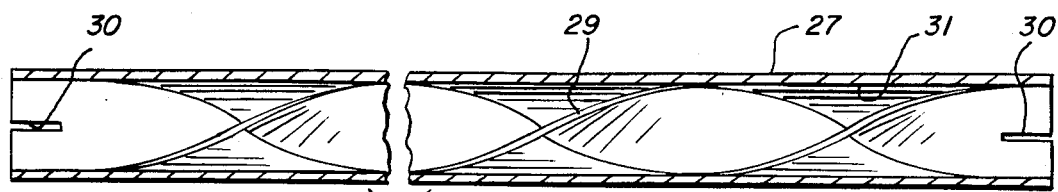

HIGH EFFICIENCY FURNACE WITH SECONDARY HEAT EXCHANGER

BACKGROUND OF THE INVENTION

1. Field of the Invention

This invention relates to furnaces and in particular to high efficiency furnaces, such as for domestic use.

2. Description of the Background Art

In one form of domestic furnace utilizing a gaseous hydrocarbon fuel, a series of parallel heat exchanger cells are provided which are fired directly by and receive the combustion products directly from the fuel burner. Conventionally, the heat exchanger cells are arranged in a side-by-side, vertical array. The combustion products are delivered from the cells to a superjacent flue collector box and the collector box passes the combustion products to the chimney, stack or flue gas outlet.

It is further conventional to provide increased efficiency in such a domestic furnace by providing air moving means for providing a forced flow of the combustion products. To provide improved efficiency in such furnaces, it has further been conventional to provide a secondary heat exchanger receiving the combustion products from the flue collector box so as to be in further heat transfer association with the air being heated. The secondary heat exchanger removes additional heat from the combustion products before they are delivered to the stack, thereby increasing the overall efficiency of the furnace.

One example of such a forced-air furnace is illustrated in U.S. Pat. No. 4,261,326 of Harry Ihlenfield. As shown therein, a furnace includes a secondary heat exchanger, or recuperator cell. As indicated therein, the use of the secondary heat exchanger reduces the temperature of the combustion products leaving the furnace to less than approximately 200° F., whereas the temperature of the exiting combustion products in a conventional, single heat exchanger furnace may be 450° F., or more. The resultant increase of efficiency can be 10% or more. Thus, while in a conventional single heat exchanger furnace, an efficiency of approximately 75% can be realized in furnaces utilizing such secondary heat exchangers, an efficiency of 90% or more may be obtained.

A problem, however, arises in the operation of such high efficiency furnaces in that the low temperature of the exiting flue gases causes the formation of liquid condensate from the products of combustion, and it is possible in domestic secondary heat exchanger furnaces to generate up to a gallon of condensate per hour of operation.

Additionally, the sulfur content of the combustion products resulting from the combustion of natural gas is, in many instances, sufficient to produce undesirable quantities of sulfur-dioxide and sulfur-trioxide. Oxides of nitrogen can also be produced from the combustion of natural gas. Some of these oxides tend to dissolve in the condensed water, forming an acidic solution which presents a disposition problem. If this acidic solution condensate is permitted to remain within the components of the furnace or to return back to the furnace components from the outlet flue, serious corrosion problems can arise, shortening the useful life of the furnace components and presenting undesirably high maintenance requirements.

A number of attempts have been made in the prior art to remove the acidic condensate from the furnace components as they are produced. One attempted method to solve this problem is shown in U.S. Pat. No. 4,164,210 of George T. Hollowell, wherein a condensate drain is provided at the foremost portion of the secondary heat exchanger.

A condensate separator is provided in U.S. Pat. No. 4,289,730 of Ronald S. Tomlinson, which patent is owned by the assignee hereof. As shown therein, the condensate separator is disposed to receive the condensate from the secondary heat exchanger prior to the delivery of the combustion products to the blower, which, in turn, delivers the combustion products to the discharge flue. In the Tomlinson patent, the separator further includes neutralizing material for neutralizing the acidic component of the condensate prior to the discharge thereof as to the conventional household drain. In the Tomlinson patent, the improved condensate separator and neutralizer is further arranged to be self-flushing.

In the furnace of the Ihlenfield U.S. Pat. No. 4,261,326 discussed above, the drain is similarly connected to the foremost portion of the secondary heat exchanger so as to remove the condensate prior to the delivery of the combustion products to the blower.

Thus, it has been conventional in the prior art to utilize means for removing the condensate from the combustion products before they enter the blower.

SUMMARY OF THE INVENTION

The present invention comprehends an improved domestic forced-air furnace, wherein the condensate is passed together with the products of combustion through a combustion air moving means and separated therefrom downstream of the air moving means.

The invention thus comprehends the provision of a condensate separating device downstream of the combustion air moving means.

The invention further comprehends an improved secondary heat exchanger and combustion air blower configuration.

In the illustrated embodiment, the secondary heat exchanger slopes downwardly from its inlet toward its outlet for facilitating transfer of condensate through the heat exchanger to the outlet while permitting effectively maximum heat transfer to the air to be conditioned as a result of the heat exchanger being arranged generally perpendicular to the flow path of the air to be conditioned.

The invention further comprehends the arrangement of the combustion air moving means, which, in the illustrated embodiment, comprises a blower, which comprises the generally horizontal, downwardly inclined flow path for the condensate received from the secondary heat exchanger.

In particular, the air moving means impeller rotates about a generally vertical axis so as to define a horizontal flow path for the condensate.

In the illustrated embodiment, the secondary heat exchanger comprises a tube-and-fin heat exchanger providing a multiple pass flow of the combustion products therethrough so as to provide increased heat transfer as the combustion products flow between the header boxes at opposite sides of the heat exchanger. Means for effecting increased turbulence of the combustion products within the secondary heat exchanger are provided, and in the illustrated embodiment, the turbulence-providing means comprises twisted mixer strips inserted into the tubes of the heat exchanger. In the illustrated embodiment, the mixer strips are provided with improved means for fitting them to the inner surfaces of the heat exchanger tubes so as to eliminate vibration and noise.

The mixer strips, in addition to increasing the turbulence of the flow, increase the length of the flow path, thereby further increasing the overall heat transfer efficiency of the furnace.

The invention further comprehends that the pressure drop in the flow path of the combustion products is caused to occur primarily across the secondary heat exchanger so that this element of the furnace may be utilized to control the overall flow rate without the need for conventional flow control orifices or variable blower capacities. In the illustrated embodiment, the air moving means comprises a blower arranged to operate over a range of moderate to high static pressures, such as from 4 to 5 inches of water. The use of such a blower permits the desirable control of the flow rate by the control of the restriction provided by the secondary heat exchanger.

The invention also comprehends the connection of the combustion air blower to the heat exchanger at a lowermost portion thereof so as to receive substantially all of the condensate from the secondary heat exchanger. The blower is further configured and positioned to discharge from its lower end substantially all of the received condensate, so that substantially all the condensate formed within the furnace is automatically passed through the secondary heat exchanger and blower to a condensate discharge downstream of the blower, thereby avoiding the problems associated with the prior art systems which attempt to separate the condensate from the products of combustion upstream of the blower.

The invention thus broadly comprehends the provision in a domestic furnace having one or more heat exchangers and combustion air moving means downstream thereof and a combustion products discharge positioned downstream of the moving means, of means for causing flow of substantially all of the liquid condensate developed in the furnace to a condensate discharge position downstream of the air moving means, thereby ridding the furnace of potentially corrosive condensate solution.

The furnace structure of the present invention is extremely simple and economical of construction while yet providing improved efficiency and reliable operation.

BRIEF DESCRIPTION OF THE DRAWINGS

Other features and advantages of the invention will be apparent from the following description taken in connection with the accompanying drawings wherein:

FIG. 3 is a vertical section taken substantially along the line 3—3 of FIG. 1;

FIG. 4 is a diametric section of the condensate separator and neutralizer;

FIG. 5 is a side elevation of the secondary heat exchanger with a portion broken away to facilitate illustration of the turbulence-inducing strips in the tubes thereof; and FIG. 6 is a fragmentary enlarged vertical section taken substantially along the line 6—6 of FIG. 5.

DESCRIPTION OF THE PREFERRED EMBODIMENT

Figure 1:
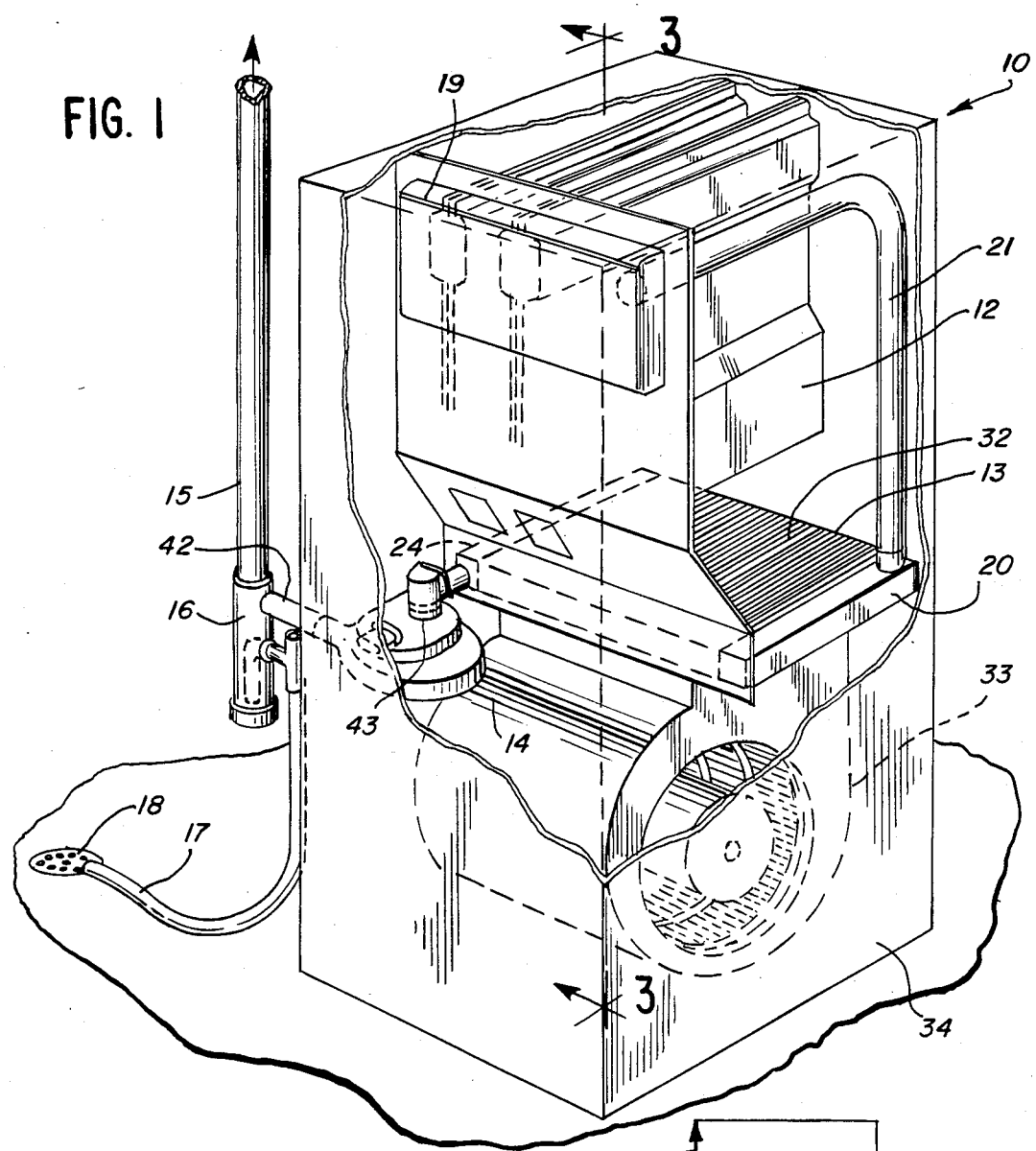
FIG. 1 is a fragmentary perspective view of a domestic furnace apparatus embodying the invention.

In the exemplary embodiment of the invention as disclosed in the drawings, a domestic forced-air furnace generally designated 10 includes a conventional burner 11 adapted to burn hydrocarbon fuel, such as natural gas. The products of combustion resulting from the burning of the natural gas fuel are passed in heat transfer relationship with air to be conditioned by flow firstly through a primary heat exchanger 12 and subsequently through a secondary heat exchanger 13. The products of combustion are drawn from the secondary heat exchanger by an air moving means generally designated 14 which, in the illustrated embodiment, comprises a blower which rotates about a vertical axis. The products of combustion are discharged from the blower to a flue gas vent pipe 15 for discharge from the household by means of a suitable vent or stack (not shown).

Condensate developed from the products of combustion, primarily in the secondary heat exchanger 13, is passed therefrom through the blower 14 to a separator 16 which separates the liquid components of the fluid flow from the gaseous components thereof. The liquid components are delivered through a suitable flow conduit 17 to a discharge position, such as defined by a floor drain 18. The gaseous components are delivered from the separator 16 to the vent pipe 15 substantially free of the liquid components.

As shown in FIG. 1, heat exchanger 12 comprises a conventional clam-shell heat exchanger provided with a flue collector box 19. Secondary heat exchanger 13 includes an inlet header box 20 which receives the products of combustion from collector box 19 through a transfer pipe 21.

In the illustrated embodiment, the products of combustion flow in a triple-pass arrangement in the heat exchanger 13 from an inlet connector 22 at one end of the inlet header 20 to an outlet connector 23 at the opposite end of an opposite outlet header 24 of the secondary heat exchanger. The inlet header is provided with a divider plate 25 defining an entrance space 26 in the inlet header communicating with the connector 22. The products of combustion flow from entrance space 26 through the heat exchanger tubes 27 to the outlet header 24. The outlet header is similarly provided with a divider plate 28 which directs the combustion products back through the heat exchanger through the middle group of tubes 27' to the inlet header 20, and then back through the final group of heat transfer tubes 27'' to the header 24 adjacent outlet connector 23.

Figure 2:
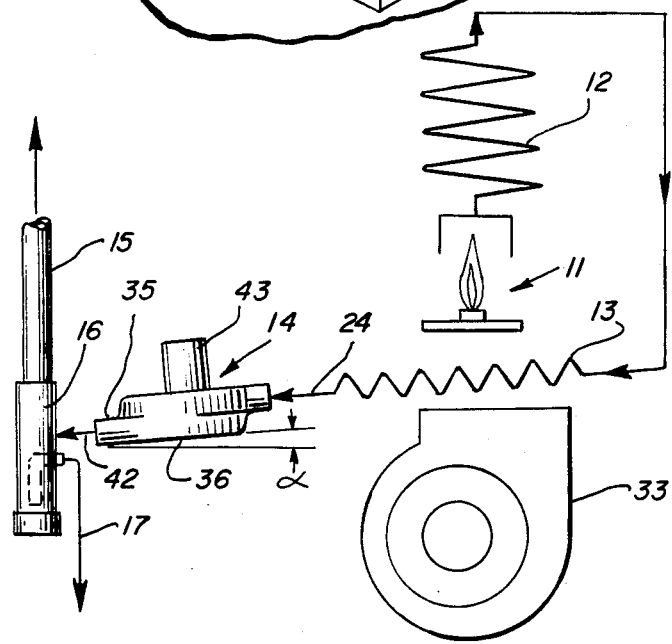
FIG. 2 is a schematic illustration of the heat exchanger, air moving means, and condensate removal means embodying the invention.

As shown in FIGS. 2, 3 and 5, heat exchanger 13 is inclined slightly to the horizontal downwardly toward the left so as to cause condensate which may form in the secondary heat exchanger to flow toward the outlet connector 23.

As illustrated in FIGS. 5 and 6, each of the heat exchanger tubes is provided with a mixer strip 29 which comprises a thin, helically twisted metal strip extending from end to end of the heat exchanger tube. At its opposite ends, the mixer strip is provided with slits 30 and resiliently deformed outwardly so as to cause the end portions of the strip at the opposite sides of the slits to be resiliently biased against the inner surface 31 of the heat exchanger tube so as to snugly retain the mixer strip in the heat exchanger tube, effectively minimizing vibration and noise. Alternatively, the end portions of each strip may be formed with tabs (not shown) which extend slightly beyond the tube ends and are bent over the tube ends to retain the strip in place.

As can be appreciated from FIG. 6, the helical configuration of the mixer strip provides improved turbulence of the products of combustion relative to the wall of the heat exchanger tube, and also provides an elongated flow path for the products of combustion to effect improved heat transfer through the heat exchanger tube.

As further illustrated in FIG. 1, the secondary heat exchanger comprises a tube-and-fin heat exchanger wherein the fins 32 extend perpendicularly to the longitudinal extent of the heat exchanger tubes for improved heat transfer to the air to be conditioned. As further shown in FIG. 1, the conditioned air is delivered to the secondary heat exchanger and then to the primary heat exchanger by means of a conventional squirrel cage blower 33 in the lower portion of the furnace cabinet 34.

Both the gaseous products of combustion and the liquid condensate formed in the secondary heat exchanger pass outwardly therefrom through the outlet connector 23 to the combustion air blower 14. As shown in FIGS. 2 and 3, the blower is inclined slightly to the horizontal downwardly from the connector 24 to its outlet 35 and defines a bottom wall 36 along which the condensate may flow substantially unimpeded to the outlet 35. As indicated briefly above, the blower comprises a vertical axis blower, and in the illustrated embodiment, utilizes backward curved vanes so as to operate over a change of moderate-to-high static pressure, such as in the range of 4 to 5 inches of water as opposed to the conventional relatively low static pressures of squirrel cage blowers, which operate at up to approximately 1 ½ inches of water. In the illustrated embodiment, the housing of the blower is formed of glass-filled polypropylene and the blower wheel is formed of stainless steel. Alternatively, the blower wheel may be formed of glass-filled polypropylene.

The use of the relatively high static pressure blower permits the heating capacity of a given furnace to be controlled by the amount of flow restriction provided by the secondary heat exchanger. Illustratively, the secondary heat exchanger for an 80,000 BTU per hour furnace is constructed to provide the three passes therethrough discussed above, whereas a lower capacity furnace, such as a 50,000 BTU per hour furnace may be provided by utilizing a five-pass secondary heat exchanger, providing a corresponding greater pressure drop through the heat exchanger, thereby reducing the total capacity without the need for orifices or other blowers.

Where a higher capacity furnace, such as a 105,000 BTU per hour furnace is desired, the heat exchanger may provide a single pass therethrough, providing minimum pressure drop in the secondary heat exchanger. The use of the mixer strips 29 is particularly advantageous in the high capacity units and may be omitted in the lower capacity furnaces, as desired. Thus, control of the capacity through control of the pressure drop of the secondary heat exchanger may be readily effected by suitable selective use of the divider plates and mixer strips, as desired, while permitting other components of the furnace to be standardized.

As indicated briefly above, the products of combustion are discharged from the blower 14 to a condensate separator 16 which, as illustrated, may form a part of the flue gas vent pipe 15. Separator 16 is illustrated in greater detail in FIG. 4. As shown, the separator includes an outer housing 37 having a lower portion which may be filled with neutralizing material 38 for neutralizing the acidic condensate before delivery thereof through the conduit 17 to the drain 18.

The separator is provided with an outlet pipe 39 having a lower end 40 opening to a lower portion of the housing, and an upper end 41 turned to open outwardly through the housing for connection thereto of the conduit 17. The products of combustion and condensate are delivered from blower 14 through a generally horizontal transfer conduit 42, opening into the upper end of the housing above the neutralizing material 38. Thus, the condensate is separated by gravity from the gaseous products of combustion and flows downwardly into the neutralizing material 38 before being discharged upwardly through the outlet pipe 39 and conduit 17 to the drain 18.

In the illustrated embodiment, blower 14 is provided with one or more air inlet holes 43 in the motor housing adjacent the motor shaft entrance to allow ambient air to pass therethrough downwardly over the motor shaft and thereby effectively prevent migration of the condensate upwardly to the motor.

As illustrated in FIG. 2, the flow path of the products of combustion through the secondary heat exchanger and blower to the condensate separator is generally horizontal but inclined downwardly toward the separator so as to cause a continuous flow of condensate formed therein to the separator in the normal operation of the furnace. Further, upon discontinuation of operation of the furnace, the downward extent of the secondary heat exchanger and blower continues the flow of the condensate effectively to the separator, thereby avoiding collection of all but a minimal amount of the acidic condensate in the components of the furnace.

The present invention avoids the necessity of tapping into the product of combustion flow path upstream of the blower, where a small condensate outlet may eventually become plugged by particulate matter and a large outlet may affect performance. By providing the condensate separator downstream of the blower the condensate flow path is defined by relatively large diameter components, and the condensate is moved forcibly by the blower 14 during periods when the furnace has cycled on. Any condensate which is transferred in vaporous form with the products of combustion to the blower is also automatically removed from the furnace effectively avoiding the problem of collection of condensate in the furnace as from liquid particles entrained in the gaseous products not effectively condensed out in the secondary heat exchanger. Thus, the novel furnace construction described herein provides an improved condensate handling arrangement for a high efficiency furnace which, in addition to ensuring reliable operation, facilitates the manufacture of the furnace.

The foregoing disclosure of specific embodiments is illustrative of the broad inventive concepts comprehended by the invention.

Having described the invention, the embodiments of the invention in which an exclusive property or privilege is claimed are defined as follows:

1. In a domestic forced-air furnace having a hydrocarbon fuel burner, the improvement comprising:
   heat exchanger means for receiving the products of combustion from said burner, said heat exchanger means being arranged to extract sufficient heat from the combustion products to cause the formation of condensate therein and being further arranged to pass substantially all of said condensate therethrough;

induced draft blower means; and means for connecting the heat exchanger means to the blower means to pass all of the combudtion products and condensate from the heat exchanger means to the blower means, said blower means passing all of the combustion products and condensate therethrough.

2. The domestic furnace of claim 1 wherein said blower means defines an inlet and an outlet, said outlet being at an elevation lower than that of the inlet.

3. The domestic furnace of claim 1 wherein said blower means includes a housing defining an inlet and an outlet, said blower housing being inclined downwardly from said inlet to said outlet.

4. The domestic furnace of claim 1 wherein said blower meand includes a housing which defines an inlet and an outlet and further defines a bottom wall arranged to direct liquid condensate thereon toward said outlet.

5. The domestic furnace of claim 4 wherein at least a portion of said heat exchanger means and said blower is arranged for causing gravity draining of the liquid condensate from said heat exchanger to said blower outlet.

6. The domestic furnace of claim 1 wherein said blower means includes a drive motor having a drive shaft and means for causing ambient air to wash over said motor drive shaft in a direction which tends to prevent the migration of condensate along said shaft toward said motor.

7. The domestic furnace of claim 1 wherein said heat exchanger means includes a primary heat exchanger and a secondary heat exchanger which receives the combustion products downstream of the primary heat exchanger.

8. The domestic furnace of claim 1 wherein said heat exchanger means includes a primary heat exchanger for receiving the combustion products directly from said burner and a secondary heat exchanger for receiving the combustion products from said primary heat exchanger, and wherein said secondary heat exchanger and said blower means define a flow path for said combustion products and said condensate which extends generally horizontally and downwardly to a discharge outlet of said blower.

9. In a domestic forced-air furnace having a hydrocarbon fuel burner, the improvement comprising:

heat exchanger means for receiving the products of combustion from said burner, said heat exchanger means being arranged to extract sufficient heat from the combustion products to cause the formation of condensate therein and being further arranged to pass substantially all of said condensate therethrough;

induced draft blower means connected to said heat exchanger for receiving the combustion products and condensate therefrom, said blower being arranged to pass all of the combustion products and condensate therethrough; and means for connecting the heat exchanger means to the blower means to pass all of the combustion products and condensate from the heat exchanger means to the blower means; and condensate separating means connected to said blower downstream thereof for receiving the condensate and combustion products discharged by said blower means and separating liquid condensate from the gaseous products of combustion.

10. The domestic furnace of claim 9 wherein a portion of said heat exchanger means and said blower means is arranged to define a continuous, downwardly inclined horizontal flow path for delivering said combustion products and said condensate to said condensate separating means.

11. In a domestic furnace apparatus having heat exchanger means for causing sufficient heat to be extracted from products of combustion formed therein to cause formation of condensate therein, the improvement comprising:

fluid moving means downstream of said heat exchanger means for causing flow of substantially all of the products of combustion through said heat exchanger means; and means for causing flow of substantially all of said condensate from said heat exchanger means to and through said fluid moving means to a condensate discharge positon downstream thereof, said fluid moving means comprising a blower having a fluid moving wheel rotatable about a vertical axis, and a bottom wall extending generally horizontally to permit drainage of condensate therein to said discharge position.

12. In a domestic furnace having heat exchanger means for causing sufficient heat to be extracted from products of combustion formed therein to cause formation of liquid condensate therein, and fluid moving means downstream of said heat exchanger means for causing flow of the products of combustion therefrom, the improvement comprising:

means defining a condensate discharge positon downstream of said fluid moving means; and means for causing flow of substantially all of said liquid condensate formed in said heat exchanger means through said fluid moving means to said condensate discharge position, including means for connecting the heat exchanger means to the fluid moving means, to pass all of the combustion products and condensate from the heat exchanger means to the fluid moving means.

13. The domestic furnace of claim 12 wherein said fluid moving means comprises a high blower.

14. The domestic furnace of claim 12 wherein said fluid moving means defines a bottom wall, an inlet and an outlet at opposite ends of said bottom wall, said outlet being at an elevation lower than that of the inlet and said bottom wall being inclined downwardly from said inlet to said outlet.

15. The domestic furnace of claim 12 wherein said means for causing flow of the liquid condensate comprises means for causing gravity draining of the liquid condensate from said means for causing flow of the products of combustion to said condensate discharge position.

16. The domestic furnace of claim 12 wherein said means for causing flow of the products of combustion includes a drive motor and means for causing ambient air to flow against said motor for preventing collection of condensate thereon.

17. The domestic furnace of claim 12 wherein said heat exchanger means includes a primary heat exchanger and a secondary heat exchanger downstream of the primary heat exchanger defining an outlet, said fluid moving means being disposed substantially horizontally of said outlet.

* * * * *